United States Patent [19]
Swanson et al.

[11] 3,917,285
[45] Nov. 4, 1975

[54] COLLAR FOR JOINT OF UNDERGROUND PIPE

[75] Inventors: Harold V. Swanson, Morris Plains; Robert E. Bald, Roseland, both of N.J.

[73] Assignee: Interpace Corporation, Parsippany, N.J.

[22] Filed: Nov. 9, 1973

[21] Appl. No.: 414,144

Related U.S. Application Data

[63] Continuation-in-part of Ser. No. 359,967, May 14, 1973.

[52] U.S. Cl. .................. 277/1; 277/229; 285/53
[51] Int. Cl. ............................................ F16j 15/10
[58] Field of Search ....... 277/1, 9, 207, 207 A, 187, 277/188, 229, 230; 285/230, 231, 53, 345

[56] References Cited
UNITED STATES PATENTS

| | | | |
|---|---|---|---|
| 1,662,603 | 3/1928 | Ferguson | 277/207 A |
| 2,051,557 | 8/1936 | Hunziker | 285/230 |

*Primary Examiner*—Robert I. Smith
*Attorney, Agent, or Firm*—Charles E. Baxley

[57] ABSTRACT

A method for joining nonmetallic pipes underground, with the pipes having mating pairs of bells and spigots, by fitting between mating spigots and bells dry distortable bands of an open celled material (preferably reticulated polyurethane foam) having a particulate water reactive material (preferably portland cement) impregnated therein and engaging each of the bands between one of the bells and its mating spigot. On wetting of the bands with water, the water reactive material therefor forms a water impervious hard sealant.

13 Claims, 7 Drawing Figures

COLLAR FOR JOINT OF UNDERGROUND PIPE

CROSS REFERENCE

This application is a continuation-in-part application with respect to copending application Ser. No. 359,967 filed May 14, 1973.

BACKGROUND OF INVENTION

This invention relates to nonmetallic pipes. The invention relates particularly to underground joints in such pipes. In the usual practice of laying pipes for underground service, lengths of the pipe are placed in an open trench with a spigot end of one length fitted into a mated bell end of the next preceding length. Such nonmetallic pipes may be made of concrete (reinforced or not), tile or like materials. Generally a diaper like form of burlap or the like (commonly referred to as a "diaper") then is applied around the joint and portland cement grout is poured therein. When installed properly, this method of joint protection offers a suitable means of assuring long term sealing and/or protection of the joint. However, experience has shown that proper workmanship in using the method has not always been realized. In part this lack of proper workmanship has been due to difficulty involved in proper practice of the method and in part to inability to provide foolproof inspection of the joint prior to its burial.

Another disadvantage of sealing and/or protecting the joint with mortar poured into a diaper is excessive cost. A contractor is obliged to use at least one extra man performing the operation, even in the smallest of pipe sizes. For larger pipe sizes progressively larger crews are needed together with necessary mixing and logistical support equipment. A further disadvantage is a requirement that excavated trenches which fill with water, generally percolating in from surrounding soil, must be dewatered prior to placement of the diaper and pouring of the grout. Yet another disadvantage of this method is difficulty that grout pouring crews have in maintaining a proper sequence of trenching, pipe joining and backfilling. It is usual, therefore, with diapered joints to have excessively long lengths of open trenches with exposed joints being readied for grouting. Long lengths of open trenches pose hazards to the public and present unsightly appearances. Cold weather is a further problem with poured grout requiring apparatus to keep the water and sand at proper levels of temperature.

STATEMENT OF INVENTION

Problems of the prior art have been solved in a particularly useful, novel, unobvious and facile manner. In accordance with a preferred method of the present invention, a dry spigot band is placed over the spigot. The spigot band is elastic, flexible and made preferably of a reticulated polyurethane foam which is impregnated with a dry particulate material such as portland cement, which is reactive with water to form a water insoluble hard sealant. After the spigot band has been placed properly on the spigot, the spigot is inserted in the usual manner into its mating bell of a previously laid length of pipe. The spigot band is thus compressed into a joint recess between the spigot and the bell. Water which enters the joint recess contacts the dry particulate material whereby the joint is sealed.

It is accordingly an object of the present invention to provide a method for joining underground nonmetallic pipes.

It is another object of the present invention to provide a method of the character stated which is simple to use.

It is still another object of the present invention to provide a method of the character stated which is inexpensive.

It is still another object of the present invention to provide a method of the character stated which is virtually foolproof and which can be inspected easily for proper application.

It is still another object of the present invention to provide a method of the character stated which is rapid to apply so as to minimize the length of time a trench must be kept open.

It is still another object of the present invention to provide a method of the character stated which can be applied when the pipe trench contains water.

It is still another object of the present invention to provide a method of the character stated which can be employed when temperatures are below freezing.

Sealing of joints from ground water entering from the exterior of the joint is a primary objective in obtaining maintenance free service of a buried nonmetallic pipeline. Also fluid being transported through the pipeline may require the interior of the joint to be sealed. Sealing of the interior of the joint is accomplished by inserting a bell band into the annular bell opening on the interior of the pipe. The bell band may stay in place prior to insertion of the mating spigot due to its own rigidity or it may be provided with an adhesive by which it is secured to the surface of the bell. Use of the bell band omits necessity of workmen entering the interior of the pipe (after jointing) to mortar the inside of the joint.

DESCRIPTION OF DRAWING

The foregoing and other objects, features and advantages will be understood more fully from a detailed description of a preferred embodiment of the invention which follows as well as from claims which also follow, all viewed in conjunction with an accompanying drawing wherein like numerals designate like parts and wherein:

DESCRIPTION OF PREFERRED EMBODIMENT

Figure 1:
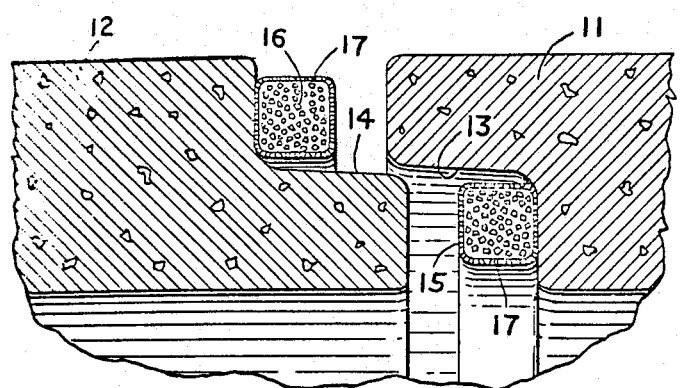
FIG. 1 is a partial vertical sectional view of a pipe joint according to the invention and having a bell and a spigot spaced apart from each other.
Figure 2:
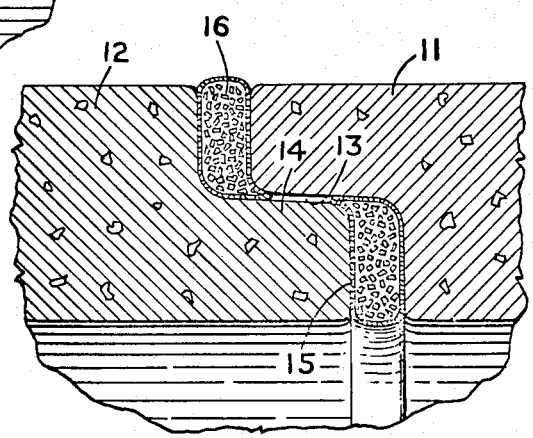
FIG. 2 is the same as FIG. 1 with the spigot engaged into the bell.
Figure 3:
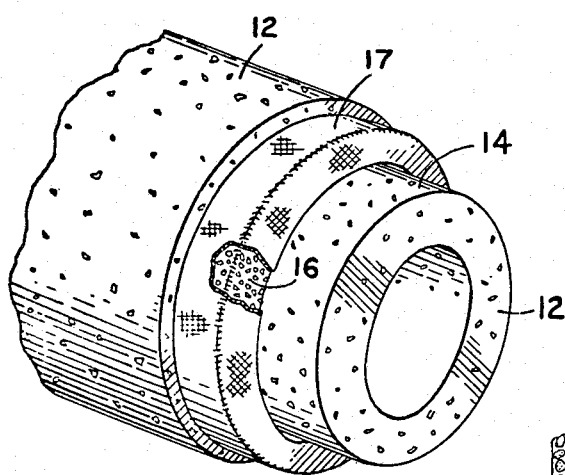
FIG. 3 is a perspective view of a spigot band according to this invention and applied to a spigot.
Figures 4, 4A:
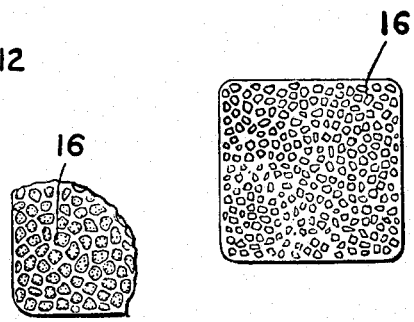
FIG. 4 is a sectional view of a reticulated foam spigot band according to this invention.
FIG. 4A is a fragmented sectional view to an enlarged scale of the reticulated foam spigot band according to this invention.

Referring to FIGS. 1–3 of the drawing which illustrates a preferred embodiment of this invention, pipes 11 and 12 are made of a nonmetallic material such as concrete (which may or may not be reinforced) or clay and are fitted respectively with a bell 13 and a spigot 14 at their respective ends. Protection and sealing of a joint formed between the bell 13 and the spigot 14 is achieved by means of a bell band 15 and a spigot band 16 preferably of reticulated polyurethane foam which are each impregnated with a suitable dry particulate material such as portland cement which is reactive with water to form a water impervious dry sealant. When the spigot 14 is inserted into the bell 13, the bell band 15 and the spigot band 16 are distorted into the joint between the pipes 11 and 12 as seen best in FIG. 2.

The spigot band 16 is stretched and pulled over the spigot 14 as shown in FIG. 1. The bell band 15 preferably is connected to the pipe 11 by means of a suitable adhesive. On insertion of the spigot 14 into the bell 13, the outer and inner portions of the joints have the spigot band 16 and the bell band 15 positioned to completely seal the joint. When ground water contacts the spigot band 16, the portland cement (or other cement) impregnated therein is hydrated, thereby the joint is sealed. Similarly, water in the pipeline activates the water hardening material of the bell band 15. By this expedient a solid, impermeable sealing of the joint is effected.

Figures 5, 6, 7:
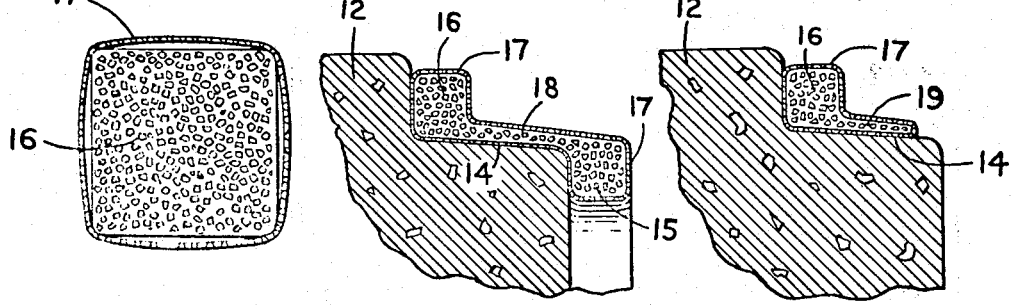
FIG. 5 is a sectional view of the reticulated foam spigot band encased in a porous fabric sheath.
FIG. 6 is a partial vertical section of a pipe end having a spigot and with an alternate embodiment of a spigot band applied thereto.
FIG. 7 is a partial vertical section of a pipe end having a spigot and with still another alternate embodiment of a spigot band applied thereto.

Several systems which can take a reticulated or network form; such as felt, wool, polymer fibers or open celled polymers; may be used to make the bands 15, 16. Usable polymers to form open celled systems include vinyl, butadiene, styrene, urethane polymers and the like. Foamed polyurethane is preferred. The foam band may be surrounded by a water soluble or water porous sheath 17 as shown in FIG. 5 to reduce portland cement loss during shipping and placing, yet allowing water to pass through the sheath for hydrating the portland cement.

Although water hardening materials other than portland cement may be used; such as for example, calcium sulphate or a mixture of portland cement and silica (and the like); portland cement is believed to be the most effective and economical of such water hardening materials.

The materials for the bands 15, 16 all are available commercially. Reticulated polyurethane foam, for example if manufactured by Scott Paper Company's Foam Division in Chester, Pa. Portland cement is conventional and is available widely. Nonwoven polyester fabric for sheath 17 is obtainable from a wide variety of suppliers. All the separate materials are assemblable by a fabricator skilled in the art of commercial textile production.

Each band preferably is packed individually in a waterproof plastic bag so as to avoid premature hydration of the portland cement. A number of such bags are packaged in a cardboard container and the container is shipped to a field site.

Investigations of joints protected by the method of the present invention, in different types of soils for significant periods of time, have shown that this method seals joints effectively. These investigations have demonstrated also that this method is readily and easily performed by inexperienced personnel. Where bell and spigot bands of reticulated polyurethane foam impregnated with portland cement are used in accordance with the present invention, no additional protection of the joint is required and applications of grout to the outsides of joints and mortar to the insides of joints are obviated.

The embodiment shown in FIG. 6 has a band with a spigot portion 16 and a bell portion 15 and with a continuous intermediate portion 18. In the embodiment of FIG. 7 a wedge portion 19 is formed on a spigot band 16.

It will be understood by those familiar with pipe design and installation that wide deviations may be made from the foregoing preferred embodiment, without departing from a main theme of invention set forth in claims which follow.

I claim:

1. A method for sealing a joint of a pipe made of a non-metallic earthen material and having a bell and a spigot, the method comprising steps as follows:
   impregnating a distortable band of a cellular water invadable material with a dry hydratable cement which is reactive with water to hydrate thereby forming a water insoluble hard sealant,
   placing the band between the spigot and the bell,
   engaging the band in the joint by inserting the spigot into the bell,
   allowing the band to be contacted with water whereby the hydration takes place.

2. The method of claim 1 with the band arranged annularly around the spigot.

3. The method of claim 2 with the band being a reticulated polyurethane foam.

4. The method of claim 1 with the cement being portland cement.

5. The method of claim 1 and providing a water permeable sheath about the band to contain the cement.

6. The method of claim 5 with the cement being portland cement.

7. The method of claim 5 with the sheath being a nonwoven polyester fabric.

8. The method of claim 1 with the band arranged annularly in the bell.

9. The method of claim 8 with the band being made of a reticulated polyurethane foam.

10. The method of claim 8 with the cement being portland cement.

11. The method of claim 8 and providing a water permeable sheath about the band to contain the cement.

12. The method of claim 11 with the cement being portland cement.

13. The method of claim 11 with the sheath being a nonwoven polyester fabric.

* * * * *

UNITED STATES PATENT AND TRADEMARK OFFICE
CERTIFICATE OF CORRECTION

PATENT NO. : 3,917,285
DATED : November 4, 1975
INVENTOR(S) : Harold V. Swanson and Robert E. Bald It is certified that error appears in the above-identified patent and that said Letters Patent are hereby corrected as shown below:

ABSTRACT

In the next to the last line, the word "therefor" should be deleted. Line would read "material forms a water impervious hard sealant."

COLUMN 3

In line 50, change "if" to is.

Signed and Sealed this tenth Day of February 1976

[SEAL]

Attest:

RUTH C. MASON
Attesting Officer

C. MARSHALL DANN
Commissioner of Patents and Trademarks